Aug. 4, 1964  P. H. SCHWEITZER  3,142,967
MAXIMUM POWER SEEKING AUTOMATIC CONTROL SYSTEM
FOR POWER-PRODUCING MACHINES
Filed Sept. 22, 1961  4 Sheets-Sheet 1

INVENTOR
Paul H. Schweitzer
BY
ATTORNEY

Aug. 4, 1964 P. H. SCHWEITZER 3,142,967
MAXIMUM POWER SEEKING AUTOMATIC CONTROL SYSTEM
FOR POWER-PRODUCING MACHINES
Filed Sept. 22, 1961 4 Sheets-Sheet 2

INVENTOR
Paul H. Schweitzer

BY *Rupert J. Brady*

ATTORNEY

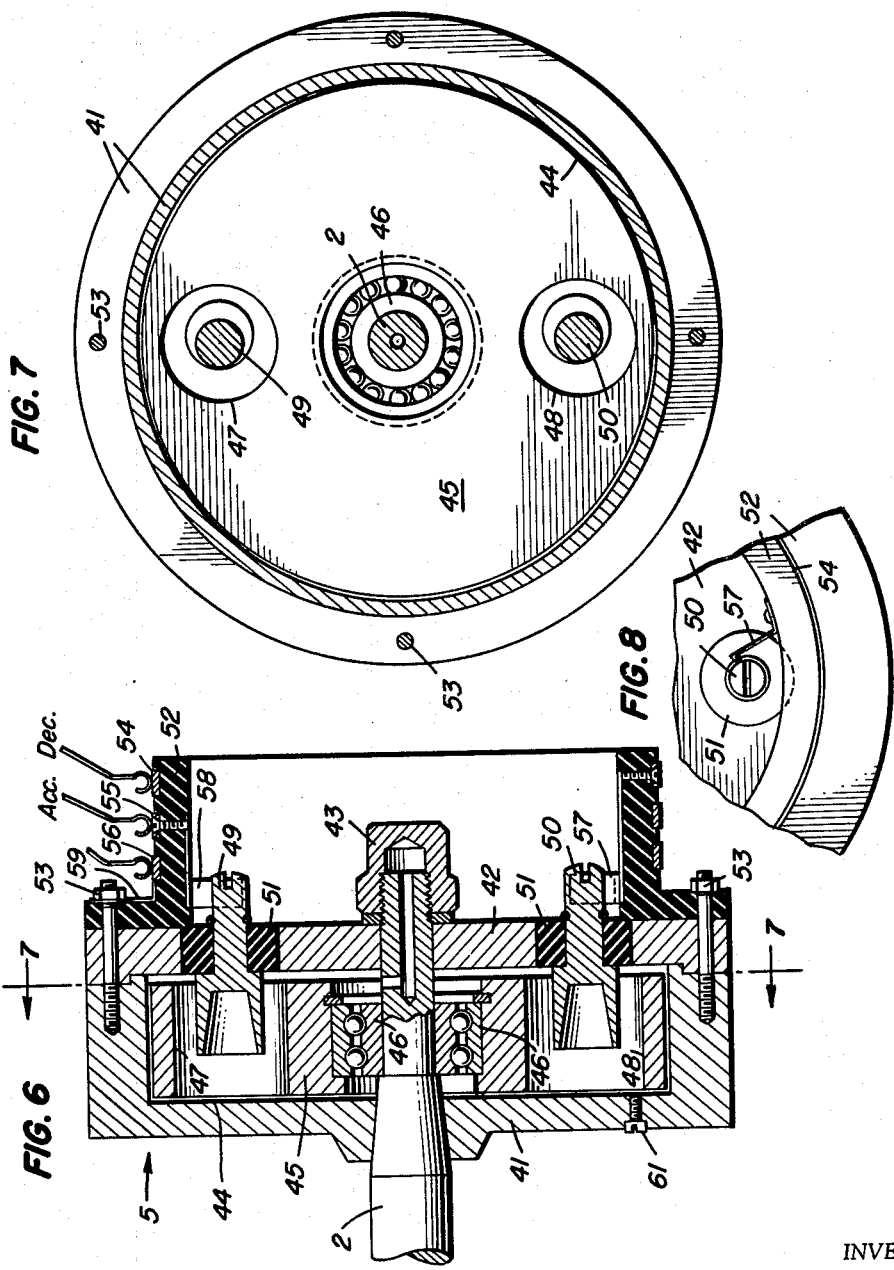

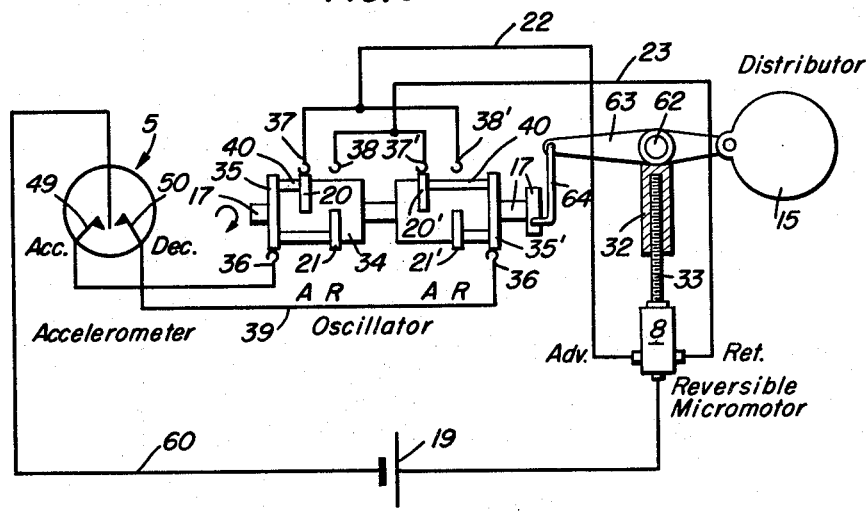
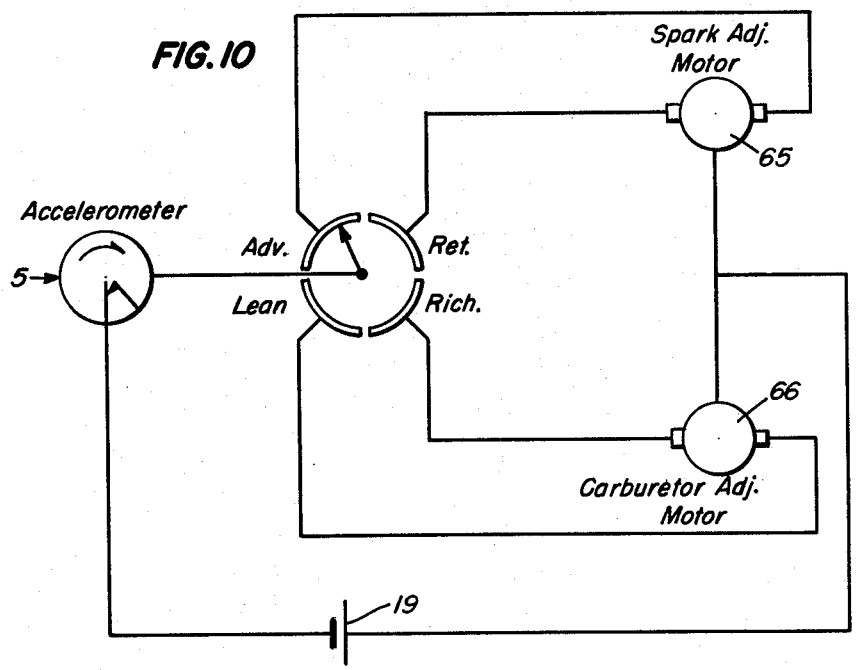

United States Patent Office 3,142,967
Patented Aug. 4, 1964

3,142,967
MAXIMUM POWER SEEKING AUTOMATIC CONTROL SYSTEM FOR POWER-PRODUCING MACHINES
Paul H. Schweitzer, 617 W. Park Ave., State College, Pa.
Filed Sept. 22, 1961, Ser. No. 141,244
Claims priority, application Germany Sept. 23, 1960
20 Claims. (Cl. 60—105)

My invention relates to a control system for power-producing machinery.

One of the objects of the invention is to provide a maximum power seeking automatic control system which enables power-producing or power-converting machinery to continuously self-adjust a selected machine variable to an optimum setting which will enable the machinery to deliver maximum power output relative to the variable.

Another object of the invention is to provide a construction of self-adjusting control system for power-producing machinery which enables the machinery to maintain maximum power output under varying operating conditions.

Still another object of the invention is to provide a control system for power producing machinery which enables the machinery to self-adjust the setting of a machine variable and to continuously improve the setting automatically to changed operating conditions.

A further object of the invention is to provide a self-adjusting control system for power-producing machines which enables the machines to maintain maximum power output irrespective of changes in engine operating conditions.

Still a further object of the invention is to provide a self-adjusting control system for power-producing machines which is applicable to all machines having a power output shaft such as internal combustion engines of the piston or turbine type; external combustion engines, such as steam engines or steam turbines; hydraulic or air turbines; electric motors; windmills; transmissions, converters; etc.

Other and further objects of the self-adjusting machine control system of the invention are set forth more fully in the specification hereinafter following by reference to the accompanying drawings, in which:

FIG. 6 is a vertical sectional view illustrating a construction of accelerometer which may be utilized in the control system of the invention;

FIG. 7 is a cross sectional view taken substantially along line 7—7 of FIG. 6;

FIG. 8 is an end elevation view of a fragmentary portion of the accelerometer of FIG. 6, and particularly showing the manner in which electrical connection is completed between the accelerometer contacts and the slip rings;

Figure 1:
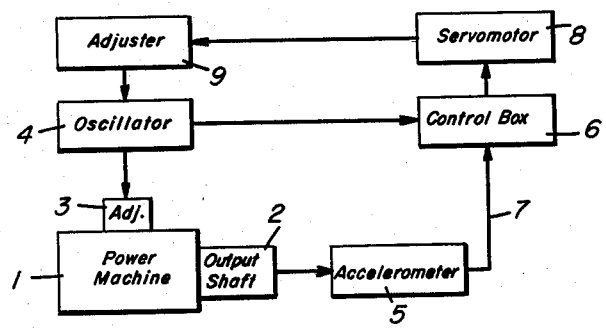
FIG. 1 is a schematic block diagram of the self-adjusting machine control system of the invention.

FIG. 9 is a schematic diagram illustrating the complete electrical circuit of the self-adjusting control system of the invention and, in addition, showing a modified form of the oscillator mechanism; and FIG. 10 is an electrical schematic diagram of a modified form of the control system of the invention, and particularly illustrating the manner in which the control system can simultaneously adjust more than one machine variable.

Each type of power-producing machine, such as internal combustion engines; external combustion engines; hydraulic and air turbines, and the like; electric motors; windmills; transmissions; etc., usually have several selectively adjustable engine variables, such as spark timing; injection timing; air-fuel ratio; compression ratio; turbine nozzle area; slide angle; field current; etc., the settings of which determine the operating efficiency of the machine. For each machine there is always an optimum or best power setting for each machine variable, and if a setting is other than optimum, the machine power output can be increased by judiciously increasing or decreasing the variable setting until maximum power output is obtained from the machine relative to that variable. However, even if the machine would maintain this optimum setting permanently, this particular variable setting would cease to be the optimum setting when operating conditions, such as speed, load, ambient temperature, altitude, grade of fuel, etc., are changed. Therefore, the problem is to provide a control system for power-producing machines which enables the machine to automatically adjust its variables to establish best power setting for the machine irrespective of changing operating conditions. The machine control system of the present invention thus enables a machine to automatically adjust its machine variables to optimum setting to provide best power output from the machine for the surrounding conditions. The only restrictions on the control system of the invention is that the machine with which it is used must have a power output shaft and the machine variable or variables must be adjustable by setting, turning, pushing, pulling, or otherwise changeable by adjustment which controls the variable. The principle of operation of the invention is that instead of adjusting the setting of a machine variable from outside the machine, I enable the machine itself to select the setting of the machine variable and improve it continuously to provide best power output relative to that variable. For this purpose in the system of the invention a selected variable X continuously oscillates or dithers within narrow pre-set limits. A sensitive accelerometer, or other speed or torque sensing device, connected with the power output shaft, senses when the machine accelerates even by a minute amount and sends a signal to the control box. The control box also receives signals continuously from the oscillator indicating whether in a particular instant the variable X is being increased or decreased. The control box compares the two signals received. If the control box finds that the machine accelerated at the instant when variable X increased, it sends a command signal to a servomotor to cause the adjuster to increase the zero position of variable X. If the control box finds that the machine accelerated at the instant when variable X decreased, it sends a command signal to the servomotor to cause the adjuster to decrease the zero position of variable X. If the control box finds that the machine decelerated at the instant when variable X increased, it sends a command signal to the servomotor to cause the adjuster to decrease the zero position of variable X. If the control box finds that the machine decelerated at the instant when variable X decreased, it sends a command signal to the servomotor to cause the adjuster to increase the zero position of variable X.

Throughout the several views, similar reference characters designate similar system components. In FIG. 1, I have shown a block diagram of the control system of the invention illustrating the arrangement of system components and flow of system information. Reference character 1 designates a power-producing or power-converting machine having a rotating output shaft 2 and a selectively variable adjustment 3 for machine variable X, such as spark timing in a spark ignition engine. Variable X is continuously varied between narrow predetermined limits by oscillator 4 which causes the machine 1 to alternately accelerate and decelerate. Accelerometer 5, connected to output shaft 2, senses the accelerations and sends electrical signals to the control box 6, via line 7. The control box also receives signals simultaneously from the oscillator indicating that at the particular instant the setting of variable X is being increased or decreased. Depending upon the coincidence of pairs of signals the control box 6 sends a command to servomotor 8 to cause adjuster 9 to increase or decrease the setting of variable X by changing adjustment 3. Everytime acceleration of the machine shaft 2 coincides with an increase of variable X signal from the oscillator, adjuster 9 will change the adjustment of adjustment 3 toward increased X. Everytime the acceleration of the machine shaft 2 coincides with a decrease of variable X signal from the oscillator, adjuster 9 will change the adjustment of adjustment 3 toward increased X. The process continues until variable X reaches its optimum value or setting corresponding to maximum power output from the machine. This setting remains until operating conditions such as load, fuel, temperature, altitude, etc. change, calling for a new setting for variable X in order to again provide maximum output from the machine.

For a concrete example, and for purposes of more fully explaining the operation of the self-adjusting machine control system of the invention, in the drawings the control system of the invention is shown arranged to continuously adjust to optimum setting, the spark timing variable of a spark ignition engine. In the example illustrated, the control system is arranged to continuously adjust the spark advance to the setting which gives maximum power output from the engine.

Although the example illustrates the control system arranged to adjust only a single engine variable, it is to be understood that the engine can be arranged to simultaneously adjust more than a single variable, as will be explained later in the specification.

In a given engine under full load full speed, and normal operating conditions the best spark advance is say 30°; that means spark occurs 30° before top dead center of the engine cycle. But if the engine speed drops from 3000 to 1500 r.p.m. the best spark advance will decrease from 30° to 20°. Similarly, the engine requires more spark advance at part load than at full load. Best spark timing depends also on the fuel used. Higher octane fuels require more spark advance than lower octane fuels.

C. F. Taylor in "The Internal Combustion Engine in Theory and Practice," 1959, p. 433, shows that if the spark timing is off 11.5° from optimum setting, the power output decreases 5%; if it is off 16.5° the decrease is 10%; if the spark timing is off 20.3° the power loss is 15%; and if it is off 24° the power loss is 20%. To insure best performance, the spark timing is adjustable in most spark-ignition engines. Hand adjustment has been used earlier in the past, but it has been largely replaced by automatic adjustment in modern engines. The present types of automatic adjustment are usually based on a flyball centrifugal governor or on a diaphragm regulator actuated by the engine manifold vacuum or both. Neither of these, nor both combined can maintain the spark timing adjustment at an optimum setting, because the relation between the best spark timing and engine speed and load is not a regular relation. Best spark timing means the spark advance setting which gives maximum power output from the engine.

At full load the best spark timing advances continuously with engine speed, but this is not true at part load. In one instance, at half load the best spark timing was at 2000, 3000 and 4000 r.p.m., 47°, 52°, and 32°, respectively. Furthermore, the engine manifold vacuum increases not only with the engine speed but also with the clogging of the air cleaner. The conventional automatic variation of the spark timing in existing engines accomplishes an imperfect approximation of the desired spark advance relative to engine speed and/or manifold vacuum and ignores completely other relevant variables such as fuel and ambient temperature. In the system of the present invention all relevant variables play a part in adjusting the spark timing to the optimum setting.

Figure 3:
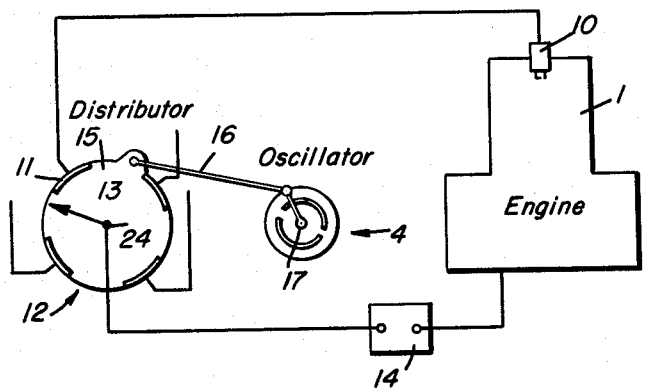
FIG. 3 is a schematic diagram of the spark timing circuit of an internal combustion engine illustrating the manner in which the engine may self-adjust its spark timing to optimum condition with the control system of the invention.

A simplified ignition system for a spark ignition engine is shown in FIG. 3 wherein the engine is indicated at 1 having a spark plug 10 electrically connected to a contact 11 in the distributor 12. The electrical circuit is completed by the rotating distributor rotor 13 which makes regular electrical contact with contact 11, the rotor being electrically connected with battery 14 which is grounded to the engine 1. In this example, the movable distributor disc 15 corresponds to the adjustment 3 in FIG. 1 for the spark timing variable. Mechanical oscillator 4 connected to the distributor disc 15, through linkage 16, oscillates the distributor disc about 3° clockwise and 3° counterclockwise, with a frequency about one hundred times per minute as oscillator shaft 17 is rotated. The spark timing will thus be alternately advanced and retarded since spark contact 11 is moved relatively to the rotating rotor 13 and the engine will automatically respond to these changes in spark timing by alternate accelerations and decelerations. The crank shaft speed of the engine will thus fluctuate, alternately increasing and decreasing one hundred times per minute.

Figure 2:
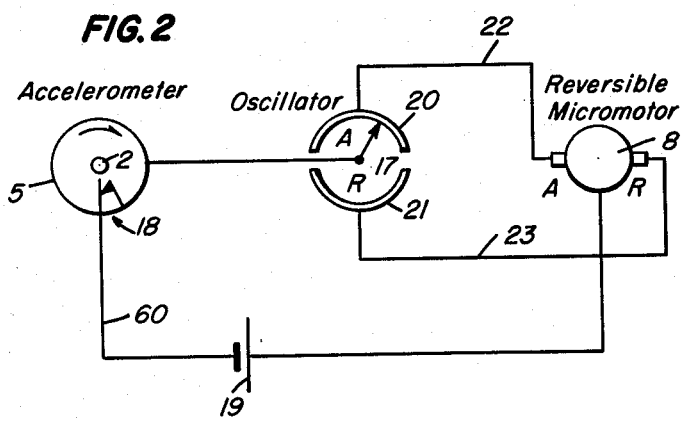
FIG. 2 is an electrical circuit diagram schematically showing the simplified electrical circuit of the control system of the invention.

As shown schematically in FIG. 2, accelerometer 5 connected to engine output shaft 2, senses the accelerations by means of its electrical contacts, schematically indicated at 18, which will thus make electrical contact one hundred times per minute.

One of the accelerometer electrical contacts is connected to the ground side of battery 19 while the other electrical contact is connected through a slip ring arrangement to control the electrical energization of a reversible micromotor 8. The acceleration contacts will coincide with the spark advance movements if the spark advance improves the engine output power. The acceleration contacts will coincide with the spark retard movements if the spark retard improves the engine power. The rotating oscillator shaft 17 carries slip ring segments 20 and 21 about its perimeter which are wiped by brushes connected through conductors 22 and 23 with the windings of reversible micromotor 8. The oscillator slip ring segments act as switches and segment 20 is connected to the motor winding which will cause the motor 8 to impart a spark advance movement to the distributor disc 15, while slip ring segment 21 is connected to a motor winding which will cause the micromotor 8 to impart a spark retard movement to the zero position of the distributor disc 15. As show in FIG. 2, when the accelerometer contact closure and the advance slip ring segment 20 of the oscillator close a circuit, pole A of the reversible micromotor 8 will be energized to cause an advance in spark timing. If the acceleration contact closure coincides with a circuit completion through the retard segment 21 of the oscillator, pole R of reversible micromotor 8 will be energized, causing the micromotor to rotate in the opposite direction, thus retarding the spark timing.

Figure 4:
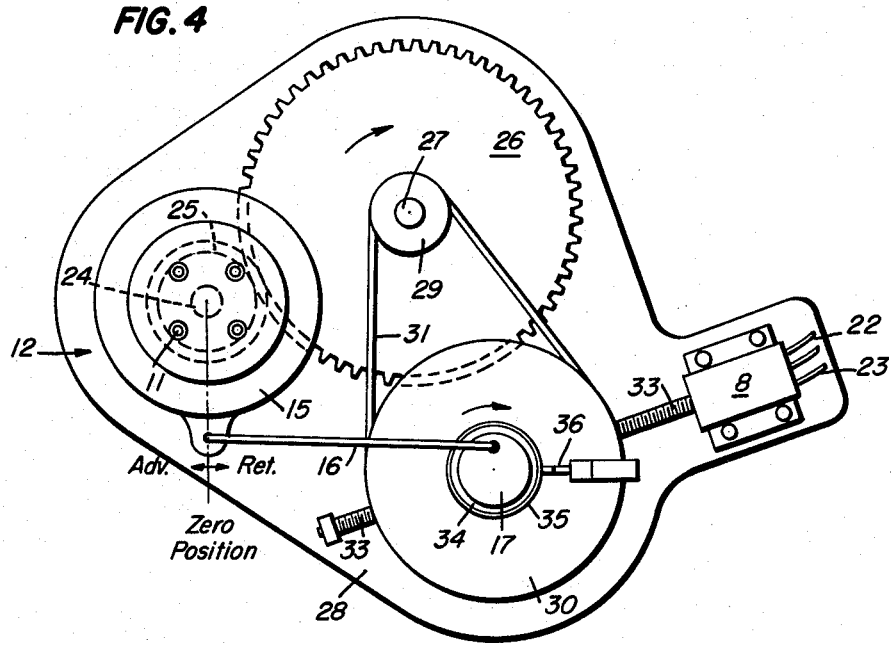
FIG. 4 is a top plan view of the oscillator mechanism of the self-adjusting control system of the invention and particularly illustrating the manner in which the distributor of an internal combustion engine is adjusted by the oscillator.
Figure 5:
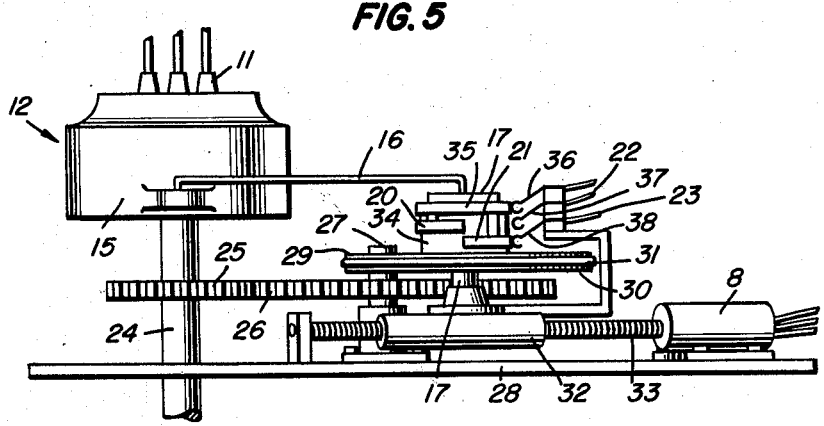
FIG. 5 is a side elevational view of the oscillator mechanism and distributor shown in FIG. 4.

A mechanism showing one means for oscillating the distributor 12, and for selectively superimposing a "permanent" advance or retard adjustment to the zero position of the distributor oscillations whenever the engine requires a new optimum spark timing setting to give maximum output power, is shown in FIGS. 4 and 5. The rotor of the ignition distributor 12 is rotated in the conventional manner by a rotating distributor shaft 24. Pinion gear 25 is keyed on shaft 24 to engage with and drive gear 26 which is keyed on rotatable shaft 27 which is suitably mounted on base plate 28. A pulley 29 is also keyed to shaft 27 and is disposed to rotate oscillator shaft 17 through pulley 30, secured to shaft 17, and belt 31 of rubber or the like, extending around the pulley members 29 and 30. A connecting rod or linkage member 16 is connected on one end to the perimeter of oscillator shaft 17 and on the other end to the distributor disc or casing 15, which carries spark plug contacts 11, such that the distributor 15 will be oscillated back and forth about a zero point as shaft 17 is rotated.

Oscillator shaft 17 is rotatably mounted on a threaded sleeve member 32 disposed for axial movement along a screw member 33 which is selectively rotatable either clockwise or counterclockwise by reversible micromotor 8. When the micromotor 8 receives a spark timing advance signal, the motor rotates screw 33 in a direction to move sleeve 32 outwardly on the screw, thus rotating distributor casing 15 in a clockwise direction through crank 16 to thus provide a new zero position or distributor spark timing setting about which the distributor is continuously oscillated. When the micromotor receives a spark retard signal, the sleeve 32 moves inwardly towards the motor to rotate the distributor casing 15 in a counterclockwise direction.

Oscillator shaft 17 turns with a speed of approximately 1/20th of distributor r.p.m., due to the gearing arrangement. For example, if a four-stroke cycle engine runs at 4000 r.p.m., the distributor shaft runs at 2000 r.p.m. and the distributor will therefore oscillate one hundred times per minute. At each oscillation the spark timing is advanced 3° and is then retarded 3°. If a larger oscillation is desired, such as 4°, the crank defined by the eccentricity of the inner end of connecting rod 16, must be made longer by connecting rod 16 further out from the center of shaft 17. If a shorter oscillation is desired, such as 2°, the crank must be made shorter.

As shown more particularly in FIGS. 5 and 9, an insulated member 34 is keyed to oscillator shaft 17 and carries a continuous electrical contact slip ring 35 thereon wiped by brush 36 electrically connected with the output of the accelerometer 5. Slip ring segments 20 and 21 are carried in opposed relation by insulated members 34 and are disposed on the periphery thereof so that brush 37 will wipe slip ring 20 during that portion of the oscillation cycle when the distributor is being moved in a spark advance direction, or clockwise, and brush 38 will wipe slip ring 21 during that portion of the oscillation cycle when the distributor is being rotated in a spark retard direction, or counterclockwise. Brush 37 is connected to the advance pole of micromotor 8 through conductor 22 while brush 38 is connected to the retard pole of micromotor 8 through conductor 23.

In FIG. 5, for purposes of simplicity, I have shown oscillator slip rings for utilizing only the acceleration electrical contacts from the accelerometer, while in FIG. 9, wherein I have shown the complete electric circuit of the control system, I have shown slip rings for utilizing both the acceleration and deceleration electrical contact signals from the accelerometer. The accelerometer contact which sense deceleration is connected to oscillator slip ring 35' through conductor 39 and brush 36'. The corresponding advance slip ring segment 20' and retard slip ring segment 21' are wiped by brushes 37' and 38', respectively, which are respectively connected to conductors 23 and 22.

In both sets of slip rings, electrical conductors extend from rings 35 and 35' to electrically connect ring segments 20, 21 and 20', 21', respectively thereto, as indicated at 40.

On the engine crankshaft or other driven power output shaft 2, an accelerometer 5 is mounted which senses acceleration and deceleration of the output shaft and makes one electrical contact whenever the shaft accelerates and another electrical contact whenever the shaft decelerates.

Details of one type of accelerometer, which may be utilized in the control system of the invention, are shown in FIGS. 6–8. The accelerometer housing, consisting of the cup-shaped member 41 and cover portion 42, is secured to the output shaft 2 by means of nut 43 threaded onto the end of shaft 2, or other suitable securing means, such as keying and the like, so that the housing members 41 and 42 rotate with the power output shaft. Inside the annular chamber 44, formed by the housing, a freely rotatable disc member 45, constructed of an electrically conductive material, is mounted to output shaft 2 by means of a precision non-friction bearing 46. The free disc 45 is provided with apertures 47 and 48 therethrough as indicated, substantially removed 180° from each other. Two electrical contact members 49 and 50, having eccentrict contact heads which extend into the apertures 47 and 48, respectively, of disc 45, are mounted in insulation bushings 51 through the cover portion 42 of the accelerometer housing. The contact members 49 and 50 are adjustably secured in the insulation bushings by means of snap rings or other suitable securing means.

A non-conducting slip ring carrier 52 is secured to the cover portion 42 of the accelerometer housing by means of studs 53 which tend to secure members 41, 42 and 52 together as a unit. Electrically conductive slip rings 54, 55 and 56 are carried on the outer perimeter of slip ring carrier 52 as shown, with slip ring 54 being electrically connected to contact member 50 by means of conductor and spring contact assembly 57, slip ring 55 being electrically connected to contact 49 by means of conductor and spring contact assembly 58, and slip ring 57 being grounded to the engine and output shaft through members 41, 53 and conductor 59.

The free disc 45 thus rotates with the housing and shaft 2 and the free disc makes electrical contact with either contact 49 or 50 when either acceleration or deceleration of shaft 2 occurs. The electric contact heads of contacts 49 and 50 normally nest freely in the apertures 47 and 48 and due to the size of the apertures the disc is free to move a few degrees relative to the housing before it abuts one of the contacts 49 or 50. When the shaft 2 accelerates, the free disc 45 lags behind the housing and touches the acceleration contact 49 to complete the electrical circuit between slip rings 55 and 56, through members 59, 49, 45, 46, 2, 41, 53 and 59, to provide an acceleration signal. When the shaft 2 decelerates the free disc 45 moves ahead of the accelerometer housing and touches contact 50 to complete the electrical circuit between slip rings 54 and 56 through members 57, 50, 45, 46, 2, 41, 53 and 59 to provide a deceleration signal. Brushes are provided to wipe the respective slip rings and connect slip ring 56 to one side of battery 19 through conductor 60, as indicated in FIG. 9, connect slip ring 55 to oscillator brush 36 and slip ring 54 to oscillator brush 36' through conductor 39.

As shown in FIG. 7, the contact heads of electrical contacts 49 and 50 are eccentrically disposed with respect to their adjusting shafts and the free travel air gap between the contacts and free disc 45 can be adjusted by turning the contacts 49 and 50 to thus turn the eccentric head portions. The travel gaps must be small in order to provide prompt accelerometer response, but should not be so small that speed fluctuation within one engine cycle would send signals from the accelerometer. In order to avoid vibration or bouncing between the contacts, the housing chamber 44 may be filled with a viscous damping fluid which can be vented through the plug 61.

It is to be understood that other versions of the circuits are possible. For instance, instead of using two contacts 49 and 50, one for acceleration and one for deceleration, a single contact can be utilized as suggested in the simplified circuit of FIG. 2, and the oscillator construction of FIG. 5. The single electrical contact in the accelerometer can be either an acceleration contact or a deceleration contact. Due to the dither provided by the oscillator, the engine alternately accelerates and decelerates. If the accelerations coincide with advancing spark timing periods, the automatic control system will advance the spark timing. If the accelerations coincide with retarding spark periods, the control system will retard the spark timing. As suggested, a deceleration contact in the accelerometer is not strictly necessary but it makes the control of the variable being adjusted much faster and safer.

If a deceleration contact is utilized in the accelerometer, then if the decelerations coincide with advancing spark periods, the control system will retard the spark timing. If decelerations coincide with retarding spark periods, the control system will advance the sparking time.

In a similar manner, one of the two contact arrangements in the oscillator mechanism could be omitted if desired. The control system could advance the spark timing whenever the "advance" segment of the oscillator coincides in time with the acceleration contact, and would retard the spark timing whenever the "advance" segment of the oscillator coincides in time with the deceleration contact from the accelerometer. However, by using four contacts, control of the engine is faster and safer.

In the overall schematic wiring diagram of FIG. 9, I have shown for purposes of simplified illustration, a somewhat modified arrangement of the oscillator mechanism. This mechanism performs the same function as that shown in FIGS. 4 and 5, but in the mechanism of FIG. 9, the sleeve 32, which moves along screw 33 when the same is rotated by micromotor 8, varies the pivot point 62 of a linkage 63 connected to rotate distributor casing 15, when linkage 63 is rocked by crank 64, connected intermediate said linkage and oscillator shaft 17. Thus, in this form of the invention, in lieu of adjusting the position of oscillator shaft 17 to adjust the zero position of the distributor oscillations, the fulcrum 62 of a lever arm linkage 63 is adjusted to perform the same function.

While I have described one application of the control system of the invention, which enables a machine to adjust its variables to obtain maximum power output, it is to be understood that the possible applications are many. To mention a few: Air-fuel ratio in spark ignition engines; injection timing and compression ratio in diesel engines; nozzle openings and blade angles in steam, gas and water turbines; shunt current and capacities in shunt and capacitor motors; and it is obvious that there are many others. The control system I have invented is for controlling power-producing or converting machines of all types having an output shaft. Not only one, but a combination of engine variables can be simultaneously handled with the self-adjusting engine control system of the invention, and even a single accelerometer can adjust more than one variable to optimum setting to secure maximum engine output relative thereto. A spark ignition engine can for instance be continuously tuned simultaneously for distributor spark timing and carburetor air-fuel ratio. One jerk, or oscillation, is used to improve the spark timing, the next jerk or oscillation the air-fuel ratio, the next again the spark timing, and the following the air-fuel ratio, etc. Instead of one hundred times per minute, as in the previous example, the spark timing and the air-fuel ratio will each change fifty times per minute. Unerringly, they will seek and find the best combination of spark timing and air-fuel ratio settings which will result in maximum power output. The simplified schematic circuit of such a control system is shown in FIG. 10, wherein the oscillator timer mechanism is shown as having four slip ring segments. In this form of the invention, a separate micromotor is used for each variable to be adjusted and the micromotors are connected in parallel. The ring segments advance and retard are connected with the spark adjuster micromotor 65 as shown, similar to the circuits of FIGS. 2 and 9, while the rich and lean ring segments are connected with the carburetor air-fuel ratio adjuster micromotor 66 in similar fashion. Half of the time the electrical circuit from the battery 19 is closed through the upper spark circuit, while for the other half of the time the circuit is closed through the lower carburetor circuit to energize the carburetor adjuster micromotor. After running for a short time, the engine will have adjusted the variables to the best combination of spark timing and air-fuel ratio, and will continue to maintain the best combination of settings to maintain maximum engine output even under changing engine operating conditions.

With the exception of the oscillator crank the described mechanism operates electrically. The mechanical oscillator can also be replaced by an electric oscillator or the continuous oscillations can be produced by the very same electric micromotor which adjusts the variable setting. Electric circuits for such control can be transistorized and miniaturized and it is also possible to employ straight hydraulic or mechanical means and various types of servomotor mechanism to this end. Also current control relays may be inserted in the electrical circuit between the battery and the micromotors so that small currents may be used for contacts and larger currents may be used for driving the adjuster micromotor or micromotors.

While I have described the control system of the invention in one of its preferred embodiments, it is to be understood that modifications can be made and that the applications of the system are many, and I desire that it be understood that no limitations upon the invention are intended other than those imposed by the scope of the appended claims.

What I claim as new and desire to secure by Letters Patent of the United States is as follows:

1. The method of operating a power-producing machine at maximum output power under varying operating conditions, said machine being of the type having a power output shaft and an adjustable machine variable the setting of which controls the power output, said method comprising: continuously varying the setting of the machine variable on either side of the variable zero setting; sensing accelerations of the power output shaft; combining the acceleration sensing signal and the phasing of the continuously varying variable setting; obtaining a summation signal from said combining step; and adjusting the machine variable zero setting to an optimum position by means of said summation signal to provide maximum output power.

2. The method of operating a power-producing machine at maximum output power under varying operating conditions, said machine being of the type having a power output shaft and an adjustable machine variable the setting of which controls the power output, said method comprising: continuously varying the setting of the machine variable on either side of the variable zero setting; sensing accelerations of the power output shaft; combining the acceleration sensing signal and the phasing of the continuously varying variable setting; obtaining a summation signal from said combining step; adjusting the machine variable zero setting to an optimum position by means of said summation signal to provide maximum output power; and continuing to continuously vary the setting of the machine variable on either side of its adjusted zero position.

3. The method of operating a power-producing machine at maximum output power under varying operating conditions, said machine being of the type having a power output shaft and an adjustable machine variable the setting of which controls the power output, said method comprising: continuously oscillating the setting of the machine variable within narrow limits on either side of the variable optimum setting; sensing accelerations of the machine power output; combining the acceleration sensing signal and the phasing of the continuously oscillating variable setting; obtaining a summation signal from said combining step; adjusting the machine variable setting to a new optimum setting by means of said summation signal to provide machine maximum output power.

4. The method of operating a power-producing machine at maximum output power under varying operating conditions, said machine being of the type having a power output shaft and an adjustable machine variable the setting of which controls the power output, said method comprising: continuously varying the setting of the machine variable on either side of the variable optimum setting; sensing decelerations of the machine power output; combining the deceleration sensing signal and the phasing of the continuously varying variable setting and obtaining a control signal; and adjusting the machine variable setting to a new optimum setting by means of said control signal to provide maximum power output from the machine.

5. The method of operating a power-producing machine at maximum output power under varying operating conditions, said machine being of the type having a power output shaft and an adjustable machine variable the setting of which controls the power output, said method comprising: continuously oscillating the setting of the machine variable on either side of the variable optimum setting; sensing accelerations and decelerations of the machine power output; combining the acceleration and deceleration sensing signals with the phasing of the continuously oscillating variable setting and obtaining a control signal; and adjusting the machine variable setting to a new optimum setting by means of said control signal to provide maximum output power.

6. The method of controlling a power-producing machine to continuously seek and operate at the maximum output power possible under the prevailing operating conditions, the machine having a power output means and adjustable machine variable means the setting of which influences the power output, said method comprising: continuously misadjusting in oscillatory fashion about a zero position the machine variable means; sensing the resulting positive and negative speed changes of the power output means; combining the power output sensing signal and the variable misadjustment signal and obtaining a control signal; and adjusting the zero position of the variable means with said control signal.

7. A maximum power seeking automatic control system for power-producing machines of the type having a rotating output shaft, comprising, adjustable machine variable means having a setting which influences the machine power output, oscillator means connected to continuously vary the setting of said variable means between predetermined limits, accelerometer means connected to the output shaft to sense accelerations and decelerations of the shaft, motor means connected to receive signals from said accelerometer means and said oscillator means, and said motor means connected to adjust the setting of said adjustable machine variable means, upon receipt of the signals, in the same direction that said oscillator means was varying the setting thereof at the instants of positive shaft accelerations.

8. A maximum power seeking automatic control system for power-producing machines of the type having a rotating output shaft and adjustable machine variable means the setting of which influences the power output, comprising, oscillator means adapted to continuously vary the setting of the adjustable machine variable means between narrow predetermined limits, accelerometer means connected to the output shaft and adapted to provide a signal upon shaft acceleration, motor means connected to adjust the setting of the variable means, said oscillator means connected to transmit an indication of instantaneous oscillator phase to said motor means and said accelerometer means connected to provide said motor means with a shaft acceleration signal, and said motor means disposed to advance the setting of the machine variable means when the acceleration signal coincides with one phase of the oscillator continuously varying motion and retard the setting of the variable means when the acceleration signal coincides with the other phase of the oscillator continuously varying motion.

9. A maximum power seeking automatic control system for power-producing machines of the type having a rotating output shaft and adjustable machine variable means the setting of which influences the power output, comprising, oscillator means adapted to continuously vary the setting of the adjustable machine variable means between narrow predetermined limits, accelerometer means connected to the output shaft and adapted to provide a signal upon shaft acceleration, motor means connected to adjust the setting of the variable means, said oscillator means connected to transmit an indication of instantaneous oscillator phase to said motor means and said accelerometer means connected to provide said motor means with a shaft acceleration signal, and said motor means disposed to rotate clockwise the setting of the machine variable means when the acceleration signal coincides with one phase of the oscillator continuously varying motion and rotate the setting of the variable means counterclockwise when the torque increase signal coincides with the other phase of the oscillator continuously varying motion.

10. A maximum power seeking automatic control system for power-producing machines of the type having a rotating output shaft and adjustable machine variable means, the setting of which influences the power output, comprising, oscillator means adapted to continuously vary the setting of the adjustable machine variable means between predetermined limits, accelerometer means connected to the output shaft and adapted to provide an acceleration signal upon shaft acceleration and a deceleration signal upon shaft deceleration, motor means connected to adjust the setting of the variable means, said oscillator means connected to transmit an indication of instantaneous phase of the continuously varying oscillator motion to said motor means and said accelerometer means connected to provide said motor means with shaft acceleration and deceleration signals, and said motor means disposed to advance the setting of the variable means when the deceleration signal coincides with one phase of the oscillator continuously varying motion and retard the setting of the variable means when the acceleration signal coincides with the other phase of the oscillator continuously varying motion.

11. A maximum power seeking automatic control system for power-producing machines, of the type having a rotating output shaft, comprising, adjustable machine variable means having a setting which influences the machine power output, oscillator means connected to continuously vary the setting of said variable means between predetermined limits, torque sensing means connected to the output shaft to sense torque increases and torque decreases of the shaft, motor means connected to receive signals from said torque sensing means and said oscillator means and said motor means connected to adjust the setting of said adjutable machine variable means, upon receipt of the signals, in the same direction that said oscillator means was varying the setting thereof at the instants of positive shaft torque increases.

12. A maximum power seeking automatic control system for power-producing machines of the type having a rotating output shaft and adjustable machine variable means the setting of which influences the power output, comprising, oscillator means adapted to continuously vary the setting of the adjustable machine variable means between narrow predetermined limits, torque sensing means connected to the output shaft and adapted to provide a signal upon shaft torque increases, motor means connected to adjust the setting of the variable means, said oscillator means connected to transmit an indication of instantaneous oscillator phase to said motor means and said torque sensing means connected to provide said motor means with a shaft torque increase signal, and said motor means disposed to advance the setting of the machine variable means when the torque increase signal coincides with one phase of the oscillator continuously varying motion and retard the setting of the variable means when the torque increase signal coincides with the other phase of the oscillator continuously varying motion.

13. A maximum power seeking automatic control system for power-producing machines of the type having a rotating output shaft and adjustable machine variable means the setting of which influences the power output, comprising, oscillator means adapted to continuously vary the setting of the adjustable machine variable means between narrow predetermined limits, torque sensing means connected to the output shaft and adapted to provide a signal upon shaft torque increases, motor means connected to adjust the setting of the variable means, said oscillator means connected to transmit an indication of instantaneous oscillator phase to said motor means and said torque sensing means connected to provide said motor means with a shaft torque increase signal, and said motor means disposed to rotate clockwise the setting of the machine variable means when the torque increase signal coincides with one phase of the oscillator continuously varying motion and rotate the setting of the variable means counterclockwise when the torque increase signal coincides with the other phase of the oscillator continuously varying motion.

14. A maximum power seeking automatic control system for power-producing machines of the type having a rotating output shaft and adjustable machine variable means, the setting of which influences the power output, comprising, oscillator means adapted to continuously vary the setting of the adjustable machine variable means between predetermined limits, torque sensing means connected to the output shaft and adapted to provide a torque increase signal upon increase in shaft torque and a torque decrease signal upon decrease in shaft torque, motor means connected to adjust the setting of the variable means, said oscillator means connected to transmit an indication of instantaneous phase of the continuously varying oscillator motion to said motor means and said torque sensing means connected to provide said motor means with shaft torque increase and torque decrease signals, and said motor means disposed to adjust the setting of the variable means in one direction when the torque decrease signal coincides with one phase of the oscillator continuously varying motion and adjust the setting of the variable means in another direction when the torque increase signal coincides with the other phase of the oscillator continuously varying motion.

15. An automatic maximum power seeking control system comprising in combination an internal combustion engine having a rotating shaft, acceleration sensing means coupled with said shaft for sensing positive and negative accelerations thereof, engine variable means capable of being adjustably carried by said engine and the adjustment of which determines power output, oscillator means coupled to said engine variable means and arranged to continuously manipulate said engine variable means between pre-set limits, control means connected to receive information from said acceleration sensing means and said oscillator means, and servomotor means connected with said control means and connected for adjusting said engine variable means on command from said control means to affect the adjusting of said engine variable to optimum setting.

16. An automatic maximum power seeking control system as set forth in claim 15 in which said oscillator means, said engine variable means, said acceleration sensing means, said control means, and said servomotor means form a servo-loop arrangement.

17. The method of controlling a power-producing machine to continuously seek and operate at the maximum output power possible under the prevailing operating conditions the machine having a power output means and adjustable machine variable means the settings of which influence the power output, said method comprising: continuously misadjusting in oscillator fashion about zero positions the machine variable means; sensing the resulting positive and negative speed changes of the power output means; combining the power output sensing signals and the variable misadjustment signals and obtaining control signals; and adjusting the zero positions of the variable means with the control signals.

18. The method of controlling a power-producing machine to continuously seek and operate at the maximum output power possible under the prevailing operating conditions the machine having a power output means and adjustable machine variable means the settings of which influence the power output, said method comprising: continuously misadjusting in oscillator fashion about zero positions the machine variable means; sensing the resulting torque increases and decreases of the power output means; combining the power output sensing signals and the variable misadjustment signals and obtaining control signals; and adjusting the zero positions of the variable means with the control signals.

19. The method of operating a power-producing machine at maximum output power under varying operating conditions, said machine being of the type having a power output shaft and an adjustable machine variable the setting of which controls the power output, said method comprising: continuously oscillating the setting of the machine variable within limits on either side of the variable initial setting; sensing torque increases of the power output shaft; combining the torque increase sensing signal and the phasing of the continuously oscillating variable setting and obtaining a control signal; and adjusting the machine variable setting to an optimum setting by means of said control signal.

20. In a power producing machine of the type having a rotating output shaft, a maximum power seeking control system comprising, adjustable machine variable means the setting of which influences the power output of the machine, an oscillator connected to continuously advance and retard the setting of said variable means back and forth to influence the power output, a torque sensing element connected to the machine to sense increases and decreases in power output, motor means connected to receive signals from said torque sensing element and said oscillator, said motor means connected to advance the zero point of the oscillations of said oscillator and thus adjust the setting of said adjustable variable means if the advance swings of the oscillations increased the power output, and retard the zero point of the oscillations and adjust said variable means in the opposite direction if the retard swings of the oscillations have decreased the power output of the machine.

No references cited.